United States Patent [19]
Joyce

[11] Patent Number: 5,305,873
[45] Date of Patent: Apr. 26, 1994

[54] PACKAGE FOR RECORDING MEDIA

[75] Inventor: Michael Joyce, Kinnelon, N.J.

[73] Assignee: Joyce Molding, Rockaway, N.J.

[21] Appl. No.: 3,121

[22] Filed: Jan. 12, 1993

[51] Int. Cl.⁵ .......................................... B65D 85/672
[52] U.S. Cl. ..................................... 206/1.5; 206/309; 206/807; 206/387
[58] Field of Search ................. 206/1.5, 309, 807, 387

[56] References Cited

U.S. PATENT DOCUMENTS

| | | | |
|---|---|---|---|
| 4,466,540 | 8/1984 | Lotrous et al. | 206/807 X |
| 4,589,549 | 5/1986 | Hehm | 206/387 |
| 4,676,370 | 6/1987 | Rudick | 206/1.5 |
| 4,759,442 | 7/1988 | Gregerson et al. | 206/1.5 X |
| 4,760,914 | 8/1988 | Gelardi et al. | 206/309 X |
| 4,834,238 | 5/1989 | Hehm et al. | 206/807 X |
| 5,031,756 | 7/1991 | Buzzard et al. | 206/807 X |
| 5,211,283 | 5/1993 | Weisburn et al. | 206/387 X |
| 5,215,188 | 6/1993 | Wittman | 206/1.5 |

Primary Examiner—Paul T. Sewell
Assistant Examiner—Ted Kavanaugh
Attorney, Agent, or Firm—William Squire

[57] ABSTRACT

The present invention relates to an improved anti-theft, security package for selectively retaining an object or releasing the object for removal from the housing. The object may be a recording medium, such as a cassette tape or compact disc. The housing has an object-receiving compartment and an object-conformal access opening which communicates with the compartment. A portion of the package, such as a member, is movable between a first position and a second position. In the first position, the member overlies the access opening to block removal of the object therefrom. In the second position of the member, the access opening is not overlain thereby and removal of the object therefrom is permitted.

18 Claims, 4 Drawing Sheets

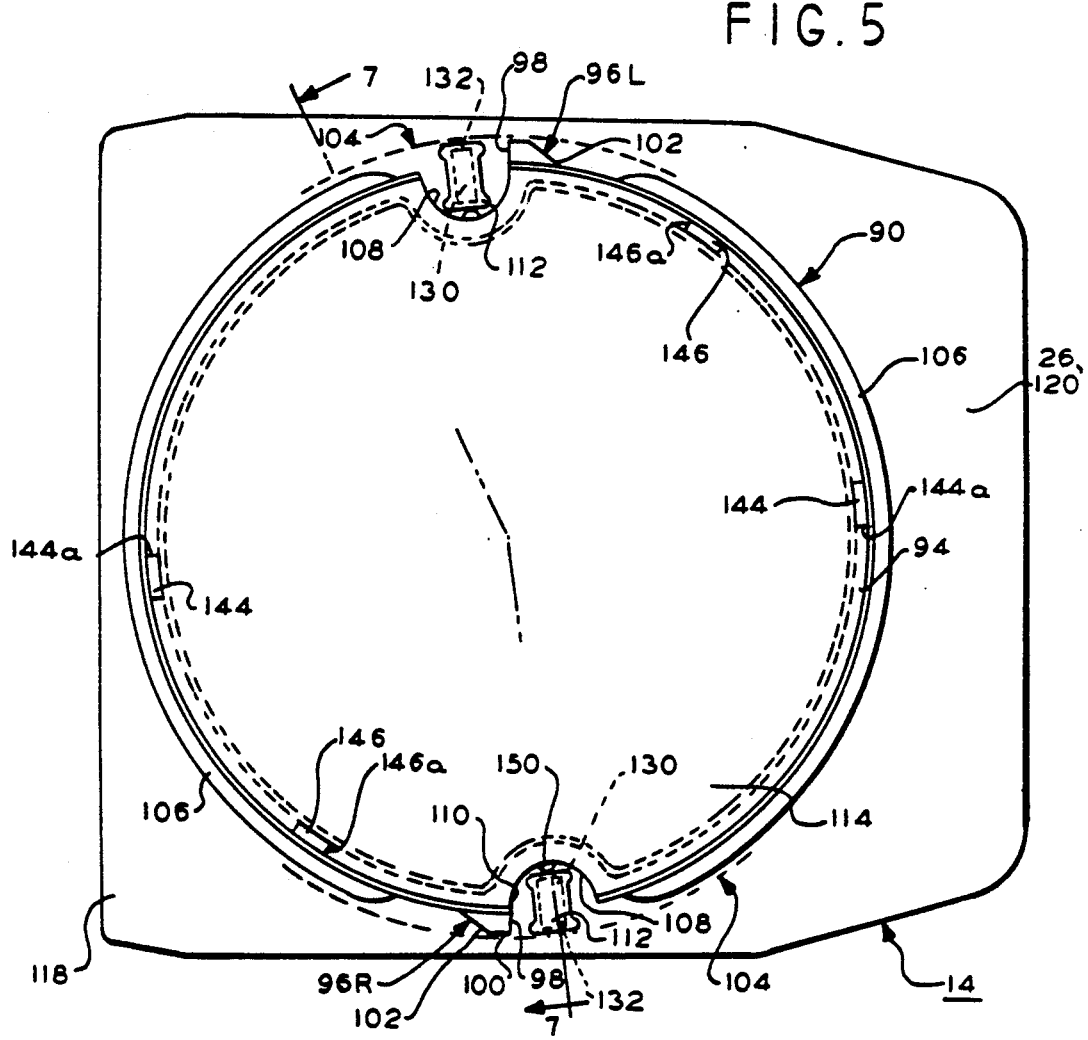
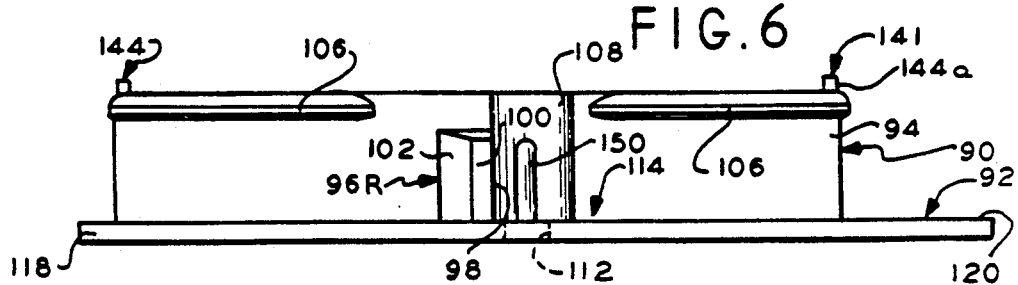
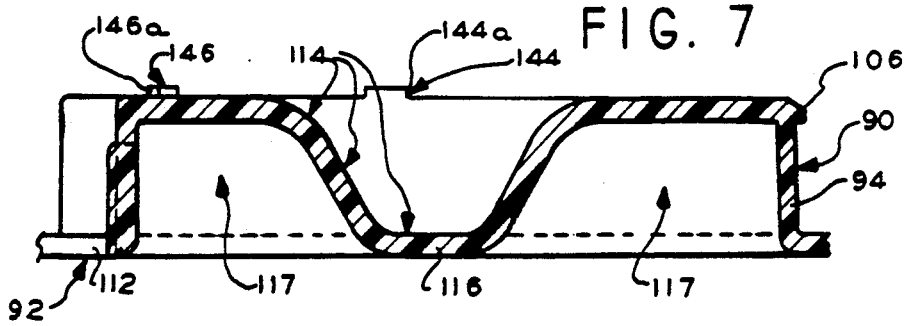

PACKAGE FOR RECORDING MEDIA

BACKGROUND OF THE INVENTION

The present invention relates to a package for recording media and, more particularly, to a reusable, theft-preventing, security package for recording media, such as audiocassettes and compact discs.

Theft-preventing packages for recording media, such as audiocassettes and compact discs, are well-known. Because they are usually molded of clear plastic, these packages typically permit display of the labels on or other literature associated with the recording media, while retaining the recording medium in the package for security, anti-theft reasons. The packages have a size which renders difficult, if it does not prevent, theft of recording media. Unlike records, audiocassettes and compact discs are quite small. If they are not captured in a large size package, they would be easy targets for theft achieved by simply being pocketed or placed in a purse.

Security packages of the above type typically include a frame-like housing of a size sufficiently larger than recording media to obviate the theft of media retained therein by pocketing or palming same. The frame also typically permits a retained recording medium to be displayed, either in a rack or bin or on a peg board. The typical clear plastic package permits relevant data—on labels or included literature—concerning what is recorded on the medium to be ascertained by a customer.

Initially, anti-theft, security packages of the type involved herein were molded so that a tape cassette or CD could be trapped or locked in a compartment thereof by a member on or portions of, the package, which, once fitted together or interlocked with a housing, could not easily be disassociated therefrom. In using the foregoing type of anti-theft package, cashiers or other store personnel (or the customer) would remove the cassette from the package by cutting or severing a portion of the package with an appropriate tool. This cutting or severing, of course, rendered the package not reusable and required its disposal. From an environmental standpoint, such single use and disposal of a molded plastic package is undesirable and, of course, is also wasteful of material and, to that extent, costly. Examples of this type of security package may be found in the following U.S. Pat. Nos. 4,245,741 to Holkestad; 4,381,836 to Rivkin, et al.; 4,567,983 to Morris; 4,572,369 to Morris; 4,759,442 to Gregerson, et al.; and 4,865,190 to Gregerson.

Modified versions of the foregoing anti-theft, security packages involve relatively movable members on the packages, which are normally locked together to a housing to trap the recording medium therein, but which may be unlocked through the use of common tools such as pliers or screw drivers. See U.S. Pat. Nos. 4,759,442 to Gregerson and 4,921,097 to Finke, et al. In the former patent, as noted above, the package may be removed by cutting or severing a member or element of the package which normally holds or retains the recording medium in the package, or, the package may be "unlocked" my manipulation of a common hand tool, such as a pliers or the like. In the latter patent, relatively lockable, medium-retaining members of the package are unlocked and opened with a screw driver. A shortcoming of the package represented by the foregoing two patents is that, to the thief or other miscreant, the matter of opening the package to remove the recording medium is relatively obvious and/or may be easily achieved, as noted, with common hand tools. Thus, these packages offer minimal anti-theft security, since one can, with little difficulty, open the package, remove the recording medium, and pocket same.

Other developments in the anti-theft packaging field are represented by U.S. Pat. Nos. 3,828,922 to Holkestad; 3,871,516 to Holkestad, et al. and 4,285,429 to MacTavish. In all three of these patents, a special "key" or the like having a configuration somewhat different from any standard hand tool is used to unlock relatively locked together medium-retaining members of the package permitting their disassociation and the subsequent removal of the recording medium. However, in all three of these patents, the type of key required is readily apparent from inspection of the package and may be easily counterfeitted or mimicked, and, similarly to packages which may be opened with common hand tools, these packages, therefore, offer limited anti-theft security for contained recording media.

Other types of reusable anti-theft packages for recording media, while possibly effective in preventing theft, involve molded plastic members or a combination of molded plastic members and mechanical elements, which are extremely complicated, thereby increasing the cost thereof. Such devices are represented by U.S. Pat. Nos. 3,933,240 to Humble; 4,589,549 to Hehn and 4,834,238 to Hehn, et al. Another rather complicated anti-theft recording medium package is represented by French Patent 2,497,992.

The reusable anti-theft package of U.S. Pat. No. 4,589,549 includes a housing having a conformal storage compartment for a recording medium. A slide plate is mounted to the housings so that it may move linearly between a first position and a second position. In the first position of the slide plate, a portion thereof overhangs the conformal storage compartment blocking removal of the recording medium therefrom. In its second position, the slide plate uncovers the conformal storage compartment and permits the recording medium to be removed. Integrally molded with the slide plate are flexible levers. A portion of the housing overlain by the slide plate includes projections. These projections engage and interfere with the levers in the slide plate in the first position thereof to normally prevent linear movement of the slide plate. The housing includes one or more openings to permit the passage therethrough of portions of a "key". When the key protrudes through the openings, the levers in the slide plate are flexed thereby out of engagement with the projections, permitting the slide plate to be linearly moved to its second position, thereby permitting removal of the recording medium. While the structure of the foregoing '549 patent is apparently effective as an anti-theft, security package, it is, as already noted, somewhat complex in structure and, therefore, requires rather complex molds, which, accordingly, increases the cost of its production. The earlier, previously-noted '992 French patent, which is in appearance somewhat different from the structure of the '549 patent, contains essentially the same elements and functions operates in essentially the same manner.

The structure covered by the above-noted '238 patent is another version of an anti-theft, recording medium package, which, while apparently effective in achieving its goal, is rather complex in structure and, accordingly, expensive to manufacture. The package of the '238 patent includes a housing with a conformal recording medium-receiving compartment. A plate connected to the main portion of the housing (through dual living hinge structure) is both linearly slidable relative to the housing and may, after being slid in a selected direction, be unfolded by being rotated out of the plane of the housing. In a first position of the slide plate, a portion thereof overlies the conformal storage compartment preventing removal of a recording medium therein. Flexible levers on the housing normally interfere with projections on the slide plate to prevent the slide plate from being linearly moved out of its first position. Openings are provided in the slide plate for the insertion thereinto of a key. The inserted key flexes the levers out of interference with the projections on the slide plate, permitting the slide plate to be linearly moved from a first position to a second position. In its second linear position, the slide plate may be unfolded on the dual living hinges, that is, rotated out of the plane of the housing, to fully uncover the storage compartment permitting removal of the recording medium.

As noted above, many of the prior art anti-theft recording medium packages are not reusable in that they must be cut or severed to remove recording media therefrom. In other prior art anti-theft packages, which are reusable, removal of the recording medium is achieved by the use of either common hand tools or simple keys, the counterfeiting of the latter which or the substitution thereof being a simple matter for a determined thief or miscreant. Yet other prior art, reusable anti-theft packages which require special keys are complex in structure and expensive to manufacture.

An object of the present invention is the provision of a reusable, anti-theft, security package for recording media, which is simple in configuration, inexpensive to manufacture and the unlocking of which requires a special key, the configuration and function of which is not obvious to (or simply reproducable by) a thief or miscreant; to thereby surreptitiously obviate removal or theft of the recording media from the package.

SUMMARY OF THE INVENTION

With the above and other objects in view, the present invention relates to an improved anti-theft, security package for selectively retaining an object or releasing the object for removal from the housing. Typically, the object is a recording medium, such as a cassette tape or compact disc. The housing has an object-receiving compartment and an object-conformal access opening which communicates with the compartment. A portion of the package, such as a member, is movable between a first position and a second position. In the first position, the member overlies the access opening to block removal of the object therefrom. In the second position of the member, the access opening is not overlain thereby and removal of the object therefrom is permitted.

In the improved package of the present invention, the member is rotatably mounted on the housing for rotation about an axis remote from, and perpendicular to, the plane of the access opening. The member is rotatable between a first and second position. In the first position of the rotatable member, a portion of the member overlies the access opening, while in its second position, this portion does not overlie the access opening. A first projection on the rotatable member rotates therewith.

A second projection is on the housing. The second projection normally lies on the rotational path of and engages the first projection to prevent rotation of both the first projection and the member when the member is in its first position. A manipulable key is selectively engageable with the second projection. When so engaged, the key moves the second projection out of the rotational path of the first projection to permit rotation of the member from the first to the second position.

In preferred embodiments, the key is selectively insertable into and through an aperture in the rotatable member for engagement with the second projection when the member is in the first position. With the key inserted into the aperture, the key is rotated to jointly rotate it and the member to rotate the member to the second position. Joint rotation of the key and the member is achieved by rotational manipulation of the key while the key is engaging the walls of the aperture.

In another preferred embodiment, the engagement between the projections occurs along a line generally parallel to the rotational axis of the rotatable member. When the key is inserted into the aperture, the path of its insertion is also generally parallel to the rotational axis of the member. The inserted key moves the second projection out of the rotational path of the first projection in a direction which is generally perpendicular to the rotational axis of the member. Typically, movement of the second projection by the key is achieved by flexing a portion of the housing on which the second projection resides out of its normal configuration in a direction perpendicularly away from the rotational axis of the member. The housing portion returns to its normal configuration, and the second projection again lies on the rotational path of the first projection, after the inserted key and the first projection by-pass the second projection following the joint rotation of the key and the member.

In yet another preferred embodiment, the projections include camming facilities, which move the second projection out of the rotational path of the first projection when the member is rotated back into the first position. The camming means operates to move the second projection out of the rotational path of the first projection whether or not the key engages the member. The flexible portion of the housing permits movement of the second projection perpendicularly away from the rotational path of the first projection whether it is so moved by engagement with the key or by the action of the camming facilities.

In an additional preferred embodiment, facilities are provided for preventing demounting of the rotational member from the housing. In this embodiment, the housing includes a depression or pocket in which the member is rotationally located. The demounting-preventing facilities comprise peripheral lips on both the rotational member and on the wall of the depression, with the latter lip trapping the former lip between itself and the floor of the depression.

In yet another additional preferred embodiment, rotation of the member from the first position toward the second position occurs in a first direction, and rotation of the member from the second position back toward the first position occurs in a second direction. A first facility prevents rotation of the member out of the first position in the second direction, and a second facility prevents rotation of the member out of the second position in the first direction. The immediately foregoing facilities permit the rotation of the member through an arc of a predetermined number of degrees in rotating from one position to the other. The preventing facilities may comprise surface features on the member and on the housing which abut when the member is in the first and second positions.

BRIEF DESCRIPTION OF THE DRAWING

FIG. 1a is an obverse (or bottom) plan view of the package shown in FIG. 1;

FIG. 5 is a magnified plan (or top) view of the rotatable member which is associated with the housing portion as depicted in FIG. 1 to achieve the novel package of the present invention;

FIG. 6 is a right side elevation of the rotatable member of FIG. 5;

FIG. 7 is a sectional view of the rotatable member of FIG. 5 taken along line 7—7 in FIG. 5.

DETAILED DESCRIPTION

Figure 1:
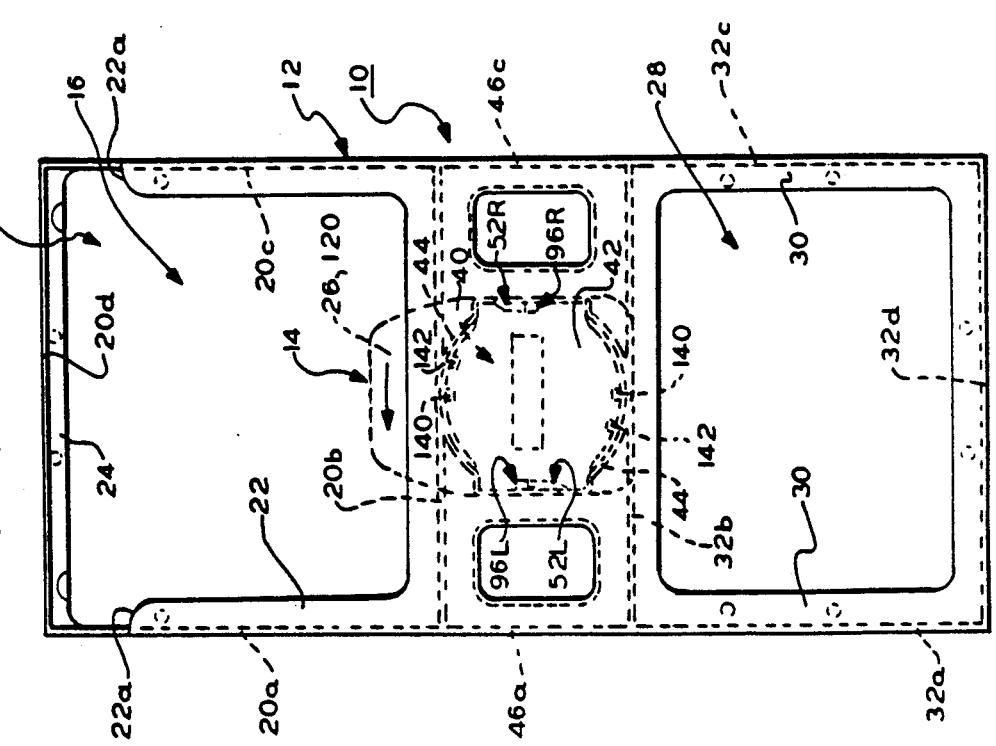
FIG. 1 is a plan (or top) view of a recording medium package in accordance with the present invention, the package comprising a housing and a rotatable member.

Referring first to FIGS. 1 and 1a, there is shown a reusable, anti-theft security package 10, according to the present invention. The package 10 includes a frame-like housing 12, shown in solid lines in FIGS. 1 and 1a, and a rotatable member 14, which is rotatably mounted on the housing 12, as hereinafter described, shown in phantom (dot-dash lines). The housing is more specifically shown in FIGS. 2-4. The rotatable member 14 is more specifically shown in FIGS. 5-7.

The package 10 is intended to selectively retain a recording medium (not shown), such as a tape cassette or a compact disc and to effect an anti-theft or security function relative thereto. In the exemplary embodiments described herein, it is assumed that the recording medium is a compact disc or CD, held in a CD "jewel box", (not shown), which is intended to be held and retained in a compartment 16 in the housing 12. The compact disc is inserted into the compartment 16 via a conformal access opening 18, which communicates with, and may simply be a continuation of, the compartment 16.

The compartment 16 is bounded by side walls 20a-20d of the housing 12 which define,, the compartment 16 and its access opening 18 as a generally rectangular region. Integral with the side walls 20a, b and c is a U-shaped flange 22, which overlies the rectangular compartment 16. Integrally formed with the side wall 20d is a separate flange 24 which underlies the compartment 16. As viewed in FIG. 1, the flange 22 is co-planar with the top plane of the housing 12, while the flange 24 is co-planar with the bottom plane of the housing 12. That is, since the housing 12 and its side walls 20 have a thickness sufficient to accommodate the thickness of the CD "jewel box" or other recording medium in the compartment 16, the flanges 22 and 24 are offset vertically (into the plane of FIG. 1). Thus, the offset is approximately equal to the thickness of a compact disc "jewel box". Accordingly, the compartment 16 is bounded by the side walls 20a-20d and by the surfaces of the flanges 22 and 24, which project over and under the compartment 16. The access opening 18 may be viewed as comprising the termini 22a of the flange 22 and the upper edge of the side wall 20d.

In use, as viewed in FIG. 1a, a CD in its "jewel box" is inserted into the compartment 16 through the access opening 18 by inserting it below the flange 24 and then dropping the "jewel box" so that it rests on the flange 22 and against the side wall 20b. Both the compartment 16 and the access 18 are generally conformal with the "jewel box" or other recording medium or container which is to be retained therein.

In order to retain the compact disc "jewel box" in the compartment 16 so that, absent "unlocking" it may not be removed therefrom, the rotatable member 14 is rotated from an "open" or second position (not shown in FIGS. 1 and 1a, but 90° counter-clockwise in FIG. 1 and 90° clockwise in FIG. 1a) to its "closed" or first position, which is depicted in dot and dash lines in FIGS. 1 and 1a. Continuing to refer to FIG. 1a, with the rotatable member 14 in the "closed" or first position, a flange-like portion 26 thereof overlies the CD "jewel box" and extends generally co-planarly with the bottom surface of the housing 12. Thus, as shown in FIG. 1a in the "closed" or first position of the rotatable member 14, the flange-like portion 26 is co-planar with the flange 24, with both flanges overlying the "jewel box", and traps the "jewel box" between itself and the underlying flange 22. As may be seen, in this "closed" or first position of the rotatable member 14, the "jewel box" is held in the compartment 16 and may not be removed from the access opening 18. As viewed in FIG. 1, with the "jewel box" trapped and retained in the compartment 16 and not removable through the access opening 18, the flange 22 overlies the "jewel box", while the flange 24 and the flange-like portion 26 underlie the "jewel box".

Preferably, the housing 12 and the rotatable member 14 are made of molded plastic, such as K resin, propylene or similar materials. In molding the housing 12 a variety of openings or configurations may be included, depending on the manner in which the applicable recording medium and its container will be displayed or stored. For example, opposite the compartment 16 and its access opening 18, the housing 12 may include an opening 28 framed by a flange 30, which is integral with side walls 32a-d of the opening 28. This opening may be used to hang the package 10 from a hook or peg, or the package 10 may be otherwise stored in a rack or cabinet as convenient. As is well-known, with the CD retained in the compartment 16, the size of the package 10, as compared with the much smaller size of the CD and its "jewel box" container, is sufficiently large to discourage attempts to secrete the compact disc in a hand, a pocket or a purse or to otherwise remove it from the premises without authority. According to the objects of the present invention, the package 10 is reusable and, in order to remove the CD, the housing 12 not be cut or otherwise severed or destroyed. Rather, the rotatable member 14 is "unlocked" by rotation to its second position so that its flange-like portion 26 no longer overlies the access opening 18 and the "jewel box" and the CD may be removed from the compartment 16 via the now unblocked access opening 18.

The package 10 may be used with various recording media such as a CD in its "jewel box" container or an audio tape in a container. To that end, the opening 28 may be sized and configured and its flange 30 may be reconfigured along the lines of the flanges 22 and 24 to permit the insertion of an audio tape container thereinto in the same manner that the CD "jewel box" is inserted into the compartment 16. In this event, the rotatable member 14 would function in such a manner that its flange-like portion 26 would overlie the compartment produced by the modification of the opening 28.

Figure 2:
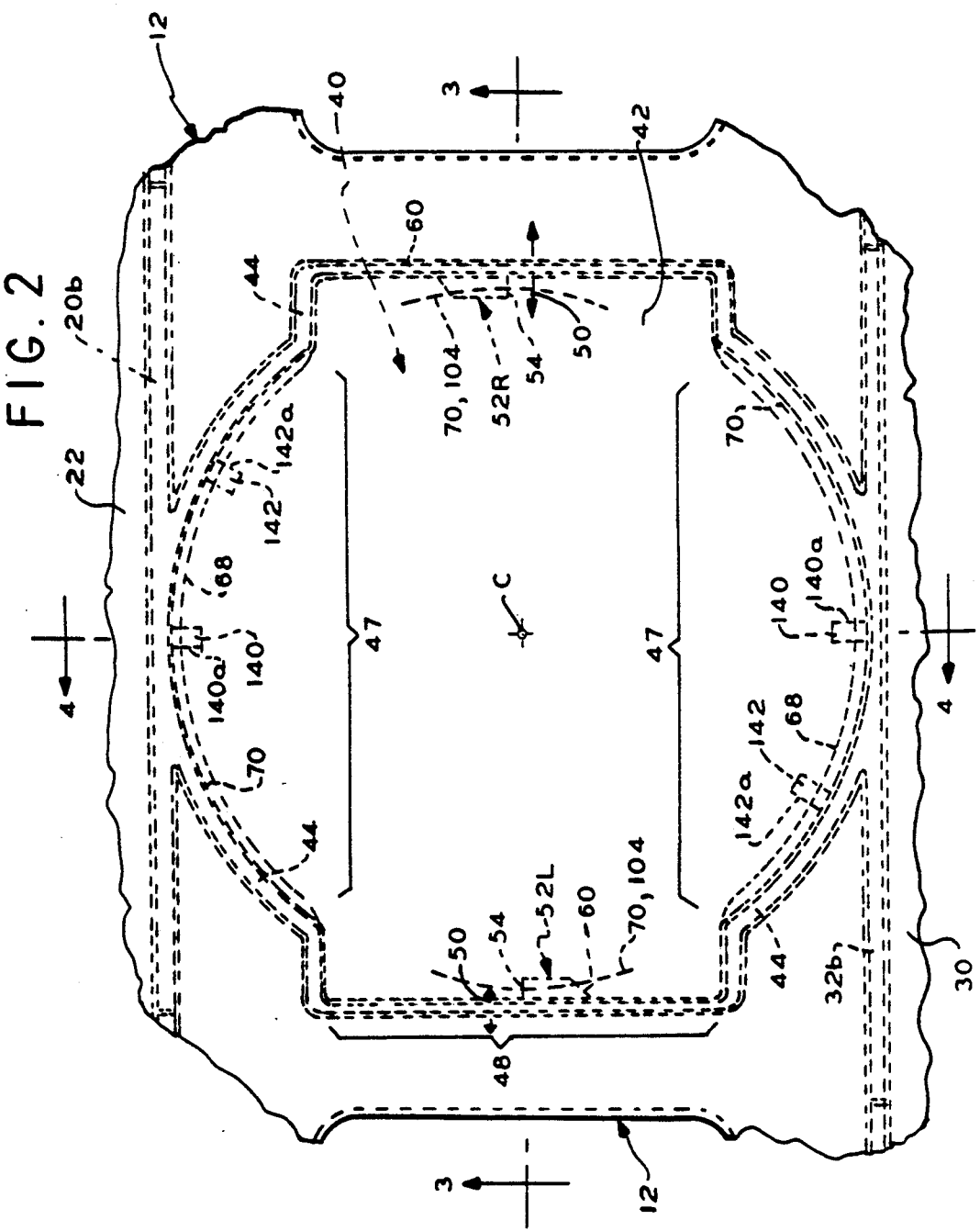
FIG. 2 is a magnified plan (top) view of a portion of the housing shown in FIG. 1.

Referring now to FIG. 2, there is shown a portion of the housing 12, as depicted in FIG. 1, magnified to some extent, to show in greater detail the constructional features thereof. Integrally molded into the frame 12 is a depression or pocket 40. As viewed in FIGS. 1 and 2, a ceiling or roof 42 of the depression 40 constitutes a web of the plastic material from which the housing 12 is molded. Integral with the ceiling 42, and extending downwardly in FIGS. 1 and 2, is a continuous, complexly-shaped side wall 44 which defines the depression or pocket 40. As can be seen from FIGS. 1, 1a and 2, mechanical strength and production considerations may dictate that the side wall 44 of the depression or pocket 40 merge into the side walls 20b and 32b. The web of plastic forming the ceiling 42 extends out and is integral with the lateral edges of the frame 12, represented by side walls 46a and 46c. The side wall 46a is a continuous bridge between the side walls 20a and 32a, while the side wall 46c is a continuous integral bridge between the side walls 20c and 32c.

As best seen in FIG. 2, the side wall 44 defining the depression or pocket 40 has two diametrically opposed generally circular portions, generally designated 47 and having a center C, which, at their midpoints, merge with the side walls 20b and 32b and two diametrically opposed rectilinear portions, generally designated 48, bridging the circular portions 47. The rectilinear portions 48 of the side wall 44 are molded to be sufficiently thin so as to be slightly flexible in a direction transverse thereof and of the frame 12 generally along a diameter of the depression or pocket 40. Such flexibility is denoted by the double-headed arrows 50. The remainder of the side wall 44, including the circular portions 47, is sufficiently rigid so as to be substantially non-flexible.

Integrally molded with the rectilinear portions 48 of the side wall 44 are projections 52, which, as described below, function as stops and as camming elements. As seen in FIGS. 1 and 2, the left hand projection has been labeled 52L and the right hand projection has been labeled 52R. In FIG. 1a, which represents the frame 12 of FIG. 1 rotated 180° about a vertical axis, the projection 52R is shown to the left, while the projection 52L is shown to the right.

Figure 3:
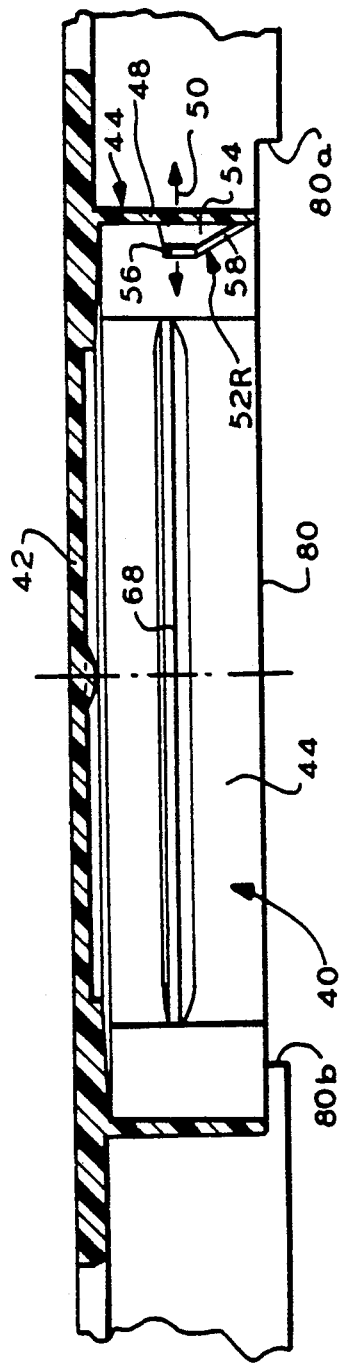
FIG. 3 is a sectional view of the housing portion depicted in FIG. 2 taken along line 3—3 in FIG. 2.
Figure 4:
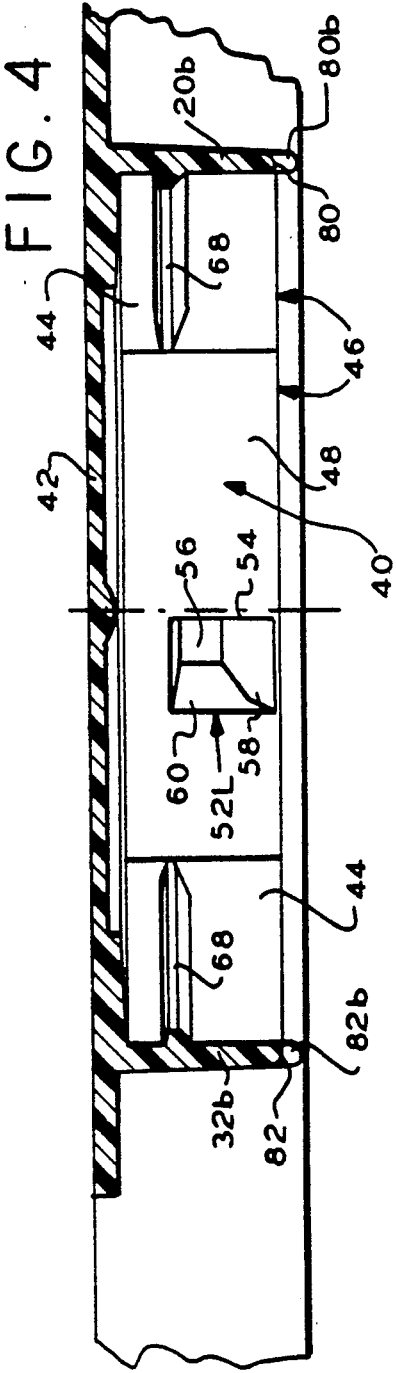
FIG. 4 is a sectional view of the housing portion depicted in FIG. 2 taken along line 4—4 in FIG. 2.

As seen in FIGS. 2–4, each projection 52 includes a generally planar stop surface 54 which is substantially vertically oriented and which is substantially parallel to or on a vertical plane which includes a diameter of the depression or pocket 40. As best seen in FIG. 2, the projection 52L presents its stop surface 54 facing the top of the figure, while the projection 52R presents its stop surface 54 toward the bottom of the figure. Further, the projection 52L extends downwardly from its stop surface 54, while the projection 52R is oppositely directly upwardly from its stop surface 54. Since the projections 52 are integrally formed with the rectilinear portions 48 of the side wall 46, flexing of such rectilinear portion 48 toward and away from the center C of the depression 40 moves the projections 52 toward and away from such center C.

In FIG. 4, the projection 52L is presented as viewed from the right in FIG. 2. The projection 52L includes a generally planar, innermost surface 56, which generally faces and is closest to the center C of the depression or pocket 40 and is generally perpendicular to the stop surface 54. Below the innermost surface 56 is a surface 58 which extends between the innermost surface 56 and the rectilinear portion 48 of the side wall 44. This sloped surface 58 extends from the innermost surface 56 to the rectilinear portion 48 away from the center C of the depression or pocket 40. Both the sloped surface 58 and the innermost surface 56 intercept the stop surface 54, as shown in FIG. 4.

The projection 52L also includes a camming surface 60. The camming surface 60 is angled away from the rectilinear portion 48 which it intersects and toward its juncture with the innermost surface 56 and the sloped surface 58. As viewed in FIG. 4, accordingly, the projection 52L presents a somewhat oddly-shaped, truncated, pyramidal configuration. The projection 52R is similarly configured, but, as shown in FIG. 2, is essentially a mirror image of the projection 52L within the depression or pocket 40. As will be clear hereafter, the projections 52 may assume variant configurations which function in a manner similar to the configuration of the present embodiment.

Integrally formed on each of the circular portions 47 of the side wall 44 is a peripheral lip or ledge 68. As hereinafter explained, the lip or ledges 68 serve to retain the rotatable member 14 rotatably mounted to the housing 12.

As best seen in FIG. 2, the interior surface of the circular portions 47 of the side wall 44 define within the depression 40 a circular envelope depicted by dashed and dotted lines 70. It should be noted that, when the rectilinear portions 48 are unflexed and in a normal position, the circular envelope 70 intersects the projections 52 for a purpose and to an end described below. Suffice it to say here that the rectilinear portions 48 are sufficiently flexible as shown by the doubled-headed arrows 50 so that the projections 52 may be moved outwardly due to such flexing away from the center C of the depression or pocket 40 so that the envelope 70 does not intersect the projections 52.

As seen in FIGS. 1a, 3 and 4, the side walls 20b and 32b are notched or decreased in height, as shown at 80 and 82. The notch at 80, in effect, produces vertical stop surfaces 80a and 80b, while the notch at 82, in effect, produces vertical stop surfaces 82a and 82b. The stop surfaces 80a, b and 82a, b are, of course, integral with and form a portion of the side walls 20b and 32b. As viewed in FIGS. 3 and 4, the lower surface of the side wall 44 of the depression or pocket 40 is generally co-planar with the floor of notches 80 and 82.

Referring now to FIGS. 1, 1a and 5–7, the rotatable member 14 of the present invention is described in greater detail.

The rotatable member 14 comprises a generally cylindrical central body 90 unitarily molded and integral with a generally planar plate 92. The cylindrical central body 90 is defined by a generally circular and continuous side wall 94 extending away from the plate 92 (upwardly in FIG. 1, downwardly in FIG. 1a). Integral with the side wall 94 are diametrical opposed are projections 96L and 96R. Each projection 96 includes a planar stop surface 98 which extends vertically from the plate 92 and is generally co-planar with a vertical plane, which includes a diameter of the cylindrical central body 90. The projections 96 also include a first cam surface 100 and a continuous second cam surface 102. The first cam surface 100 intersects the stop surface 98 and the second cam surface 102. The second cam surface 102 intersects the first cam surface 100 and the side wall 94 of the cylindrical central body 90.

The projections 96 of the cylindrical body 90 define a circular envelope 104. The envelope 104 is substantially congruent with the envelope 70 defined within the depression or pocket 40. The diameter of the body 90 is smaller than that of the envelope 70. Thus, as described below, the cylindrical central body 90 of the rotatable member 14 is designed and configured to be inserted into and to be rotationally retained within and rotationally mounted to the depression or pocket 40 of the housing 12.

When the central cylindrical body 90 of the rotatable member 14 is inserted into the depression or pocket 40 of the housing 12, the effect is the same as superpositioning FIG. 2 on FIG. 5 with the rotatable member 14 (plate 92 lowermost), as depicted in FIG. 5, being inserted upwardly into the depression or pocket 40, as depicted in FIG. 2 (ceiling 42 uppermost), from beneath the plane of FIG. 2. Following this insertion, with the rotatable member 14 in a normal or first position, as depicted in FIGS. 1 and 1a, the respective stop surfaces 98 of each projection 96 on the rotatable member 14 and the stop surfaces 54 on the projections 52 engage. In this first position of the member 14, the cylindrical central body 90 (and its envelope 104) and the integral plate 92 cannot be rotated within the depression or pocket 40.

The outer surface of the side wall 94 of the cylindrical central body 90 includes nearly semicircular peripheral sector lips or ledges 106, which, as best seen in FIG. 6, are spaced upwardly from the plate 92. These lips or ledges 106 are integrally molded with the side wall 94. When the cylindrical central body 90 is initially inserted into the depression or pocket 40, the lips or ledges 106 are trapped between the lips or ledges 68 and the ceiling 42 of the depression or pocket 40. This trapping prevents the rotatable member 14 from being disassociated from the housing 12 or removed from the depression 40 in a direction parallel to the axis of rotational movement of the rotatable member 14 within the housing 12.

Adjacent the stop surface 98 of each projection 96 is a depression 108 formed in the side wall 94. These depressions 108 may assume the semi-circular configuration depicted (or some other configurations). The portion of the side wall 110 of each depression 108 immediately adjacent the stop surface 98 is more or less co-planar or continuous therewith.

Formed through the plate 92 in vertical alignment with the depressions 108 are apertures 112. Each aperture is configured so that a properly configured, elongated member inserted therethrough, from the bottom of the plate 92 and extending down along the accompanying depression 108 will have an outer surface generally co-planar with the first cam surface 100 of the adjacent projection 96 and, accordingly, co-planoar with the envelope 104.

When the rotatable member 14 is viewed from the side opposite that depicted in FIG. 5, specifically, from the bottom of FIG. 7, it may be seen that a ceiling or roof 114 of the cylindrical volume bounded by the cylindrical central body 90 is configured to have a central rib 116, which is generally co-planar with the plate 92 and a pair of depressions 117 on either side of the rib 116. For purposes of convenient plastic molding of the rotatable member 14, the obverse side of the ceiling or roof 114 is a mirror image of the configuration just described.

The plate 92 comprises a rearward segment 118 and a forward segment 120. When the cylindrical central body 90 of the rotational member 14 is held in the depression or pocket 40 of the housing 12, as depicted in FIGS. 1 and 1a, and the rotatable member 14 is in its first or "locked" position, the rearward segment 118 extends generally along the side wall 32b. In this position of the rotatable member 14, the forward segment 120 of the plate 92 comprises the flange-like portion 26 of the rotatable member 14. As may be recalled, this flange-like portion 26 (the forward segment 120 of the plate 92) traps the recording medium between itself and the flange 22 to lock the recording medium in the compartment 16. Similarly, appropriate rotation of the rotatable member 14, as depicted in FIGS. 1 and 1a, moves the forward segment 120 (the flange-like portion 26) away from its normal overlying relationship with the access opening 18 to permit the recording medium to be removed from the compartment 16 via the access opening 18.

Figure 8:
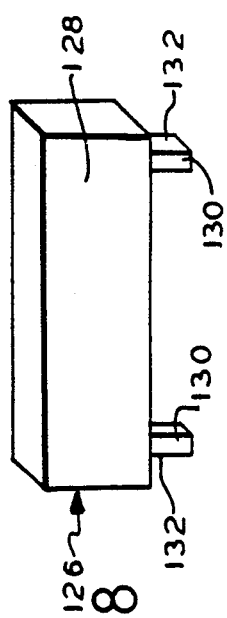
FIG. 8 is a perspective view depicting a key used to unlock the package of FIG. 1.

Normally, once the rotatable member 14 is appropriately located in the depression or pocket 40 of the housing 12, it cannot rotate due to the interference between the stop surfaces 54 and 98. Desired rotation of the member 14 is counter-clockwise as viewed in FIGS. 1, 2 and 5, and clockwise as viewed in FIG. 1a. When it is desired to free a recording medium for release from the compartment 16 through the access opening 18, a key 126 (FIG. 8) is manipulated so that prongs 130 thereon are inserted through the apertures 112 in the plate 92 of the rotatable member 14 (See FIG. 5). Such insertion of the prongs 130 causes a surface 132 on each thereof to engage and move upwardly along the sloped surfaces 58 of the projections 52 and ultimately to engage the innermost surface 56 of the projections 52. This engagement between the surface 132 of the prongs 130 and the surfaces 56 and 58 of the projections 52 forces the projections 52 outwardly from the center C and flexes the rectilinear portions 48 of the side wall 44 outwardly, as depicted by the double-headed arrows 50.

Outward flexing of the rectilinear portion 48 effects disengagement between the stop surfaces 98 and 54. As viewed in FIG. 1a from the bottom of the package 10, since the envelopes 80 and 104 no longer intersect the projections 52, the rotatable member 14 may now be rotated in a clockwise direction (counterclockwise in FIG. 1), thereby unblocking the access opening 18 to permit removal of the recording medium from the compartment 16. It is again noted that clockwise rotation of the rotatable member 14 in FIG. 1a effects counter-clockwise rotation of the rotatable member 14 as viewed in FIGS. 1, 2 and 5. During the rotation of the rotatable member 14, the lip or ledge 106 on the cylindrical central body 90 is trapped, as discussed above, between the lip or ledge 68 formed on the side wall 44 of the depression or pocket 40 and the ceiling 42 of the depression or pocket 40.

After the rotatable member 14 is rotated approximately 90° to a second or "unlocked" position, it is prevented from further rotation, as described below. Following removal of the recording medium, the package 10 may be reused by inserting a new recording medium into the compartment 16 through the access opening 18 and rotating the rotatable member 14 counter-clockwise, as viewed in FIG. 1a (clockwise as viewed in FIGS. 1, 2 and 5) back toward the normal or first position of the rotatable member 14. At some point in the rotation of the rotatable member 14 back to its first position, the second cam surfaces 102 on the projections 96 first engage and then begin to move past the camming surfaces 60 and the innermost surfaces 56 on the projections 52. Following this engagement, as rotation of the rotatable member 14 continues, the camming surfaces 60 and the innermost surfaces 56 of the projections 52 are moved outwardly in the general direction of the double-headed arrows 50, thereby causing flexing of the rectilinear portion 48 of the side wall 44. This flexing of the side wall 44 permits the projections 96 to by-pass the projections 52 until the rotatable member 14 once again assumes its normal or first position as depicted in FIGS. 1 and 1a. It will be recalled that in this normal or first position, absent insertion of the prongs 130 through the apertures 112 the stop surfaces 98 on the projections 96 engage the stop surfaces 54 on the projections 52 to prevent movement of the rotatable member 14 out of its first position and toward its second position.

As best seen in FIGS. 2 and 5, facilities are provided for preventing clockwise rotation of the rotatable member 14, as viewed in FIGS. 1, 2 and 5, out of its first position and counter-clockwise movement of the rotatable member 14 (again as viewed in FIGS. 1, 2 and 5) out of its second position. These facilities require the rotatable member 14, as viewed in FIGS. 1, 2 and 5, to rotate, if at all, out of the first position counter-clockwise 90° into the second position and to rotate clockwise 90° out of the second position back to the first position.

The foregoing mentioned facilities constitute diametrically opposed pairs of protrusions 140 and 142 formed on the ceiling 42 of the depression or pocket 40 at the junction thereof with the side wall 44 and diametrically opposed pairs of protrusions 144 and 146 formed on the top of the side wall 94 of the body 90. With the rotatable member 14 in its first position 14, stop surfaces 140a on the protrusions 140 are engaged by stop surfaces 142a on the stop surfaces 142. This engagement prevents clockwise rotation of the rotatable member 14, as viewed in FIGS. 1, 2 and 5. Accordingly, the engagement between the stop surfaces 140a and 142a and the engagement between the stop surfaces 54 and 98 define the first position of the rotatable member 14. Following insertion of the key and the bypassing of the projections 52 by the projections 98 with the rotatable member rotating in the counter-clockwise direction (as viewed in FIGS. 1, 2 and 5), the stop surfaces 142a move away from the stop surfaces 140a. Clockwise rotation of the rotatable member 14 continues until stop surfaces 144a on the protrusions 144 engage stop surfaces 142a on the protrusions 142. This engagement occurs after the rotatable member 14 has rotated in a counter-clockwise direction approximately 90°. Thus, engagement between the stop surfaces 146a and 142a defines the second position of the rotatable member 14.

As noted earlier, insertion of the prongs 130 causes the outer surfaces 132 thereof to progressively move down and, accordingly, to move outwardly the sloped surfaces 58 and the innermost surfaces 56 of the projections 52 when the rotatable member 14 is in its first position. Further, the outward movement of the surfaces 56 and 58 and the concomitant outward movement of the projections 52 ultimately effects, due to flexing of the side wall 44 of the depression or pocket 40, removal of the stop surfaces 54 from interference with the stop surfaces 98, thus permitting the rotatable member 14 to be rotated from its first "unlocked" to its second "unlocked" position. In preferred embodiments, rotation of the rotatable member 14 is effected with the prongs 130 remaining in the apertures 112 formed in the plate 92 of the rotatable member 14. Thus, after the prongs 130 are inserted into the apertures 112 move the projections 52 out of the path of the projections 96, thereby freeing the member 14 for rotation, a body 128 of the key 126 to which the prongs 130 are attached may be continued to be grasped and rotatably manipulated by a human operator to effect the required rotation of the rotatable member 14 which permits the release of the recording medium from the compartment 16. In returning the rotatable member 14 from its second position to its first position, the key 126 may be utilized, although this is not necessary. Specifically, if the rotatable member 14 is rotated by manipulating it with the fingers of the hand, these fingers may be inserted into the depressions 117 as they also grasp the rib 116 of the rotatable member 14 to effect return of the rotatable member 14 back to its initial or first position. It should be apparent that, whether or not the prongs 130 of the key 126 protrude through the apertures 112, the second cam surface 102 and the first cam surface 100 of the projections 96 will engage and move outwardly the camming surface 60 and the innermost surface 56 of the projections 52 by sufficiently flexing the side wall 44 of the depression or pocket 40, to permit the projections 96 to by-pass the projections 52, as the rotatable member moves into its initial or first position.

As seen in FIG. 5, the depressions 108 directly overlie the projections 52 when the rotatable member 14 is in its first position. This ensures that insertion of the prongs 130 into the apertures 112, which are also aligned with the depressions 108, will bring the surface 132 of the prongs 130 into appropriate engagement with the sloped surface 58 of the projections 52 to initiate outward movement of such projections 52. To ensure that the surfaces 132 of the prongs 130 effect such outward movement of the projections 52 and the concomitant flexing of the side wall 44 of the depression or pocket 40, a raised rib or bead 150 may be present within the depression 108. The ribs 150 cause the prongs 130 inserted through the apertures 112 to sufficiently forced against the sloped surfaces 58 to effect the desired outward movement of the projections 52 and the outward flexing of the side wall 44.

As shown in FIG. 5, the apertures 112 may assume a complex shape, such as the butterfly configuration depicted. It should be obvious that aperture 112 and prongs 130 of any suitable cross-section may be utilized as long as the surfaces 132 of the prongs 130 are brought to bear against the sloped surface 58, as described above. In order to confuse unauthorized persons and miscreants, however, it may be effective to complexly configure the aperture 112 so as to create the impression that a prong 130 having a matching complex cross-section is required. It is felt that configuring the aperture 112 in the complex manner shown creates confusion and uncertainty in the minds of potential interlopers and miscreants as to exactly how unauthorized unlocking of the package 10 may be achieved.

Those skilled in the art will appreciate that variant structures may be employed to achieve the function and result of the above-described embodiment while falling within the scope of the following claims.

I claim:

1. A reusable, anti-theft security package for selectively (i) retaining an object in a housing and for (ii) releasing the object for removal from the housing; the housing having an object-receiving compartment and an object-conformal access opening communicating with the compartment; the package being of the type in which a member is movable between a first position, whereat it overlies the access opening to block removal of the object therefrom, and a second position, whereat it does not overlie the access opening to permit removal of the object therefrom; wherein the improvement comprises:

the member being rotatably mounted on the housing for rotation between the first and second positions, generally parallel to the plane of the housing about an axis which is both generally perpendicular to the plane of the housing and remote from the access opening a portion of the member overlying the access opening in the first position and not overlying the access opening in the second position;

a first projection on the member which rotates therewith; and a second projection on the housing, the second projection normally lying on a rotational path of and engaging the first projection when the member is in the first position to prevent rotation of both the first projection and the member;

a manipulable key being selectively engageable with the second projection for moving the second projection out of the rotational path of the first projection to permit rotation of the member from the first to the second position.

2. Apparatus as in claim 1, which further comprises:
an aperture through the member into which aperture the key is selectively insertable for engagement with the second projection when the member is in the first position.

3. Apparatus as in claim 2, wherein:
with the key inserted into the aperture, the key is rotatable to jointly rotate it and the member to thereby rotate the member to the second position.

4. Apparatus as in claim 3, wherein:
joint rotation of the key and the member is achieved by rotational manipulation of the key, engagement of the key with the aperture effecting rotation of the member.

5. Apparatus as in claim 1, wherein:
the engagement between the projections occurs along a line generally parallel to the rotational axis of the member.

6. Apparatus as in claim 5, which further comprises:
an aperture through the member into which aperture the key is insertable along a path generally parallel to the rotational axis of the member for engagement with the second projection when the member is in the first position.

7. Apparatus as in claim 6, wherein:
movement of the second projection out of the rotational path of the first projection occurs in a direction generally perpendicular to the rotational axis of the member.

8. Apparatus as in claim 7, wherein:
with the key inserted into the aperture, the key and the member are jointly rotatable to rotate the member to the second position.

9. Apparatus as in claim 8, wherein:
movement of the second projection is achieved by engagement thereof by the inserted key to flex a portion of the housing on which the second projection resides out of its normal configuration in a direction away from the rotational axis of the member, the housing portion returning to its normal configuration, and the second projection again lying on the rotational path of the first projection, after the inserted key and the first projection by-pass the second projection following joint rotation of the key and the member.

10. Apparatus as in claim 1, which further comprises:
camming means on the projections for moving the second projection out of the rotational path of the first projection when the member is rotated back into the first position.

11. Apparatus as in claim 10, wherein:
the key engages the member while it engages the second projection and while the member is rotated form the first to the second location.

12. Apparatus as in claim 11, wherein:
the camming means moves the second projection out of the rotational path of the first projection when the member is rotated back into the first position whether or not the key engages the member.

13. Apparatus as in claim 12, wherein:
the second projection is located on a portion of the housing which is capable of limited flexing out of a normal configuration in a direction away from and generally perpendicular to the rotational axis of the member as a result at the second projection being moved by the key or the camming means, the housing portion returning to its normal configuration, and the second projection again lying on the rotational path of the first projection, after the first projection by-passes the second projection.

14. Apparatus as in claim 1, which further comprises:
means for preventing demounting of the member from the housing.

15. Apparatus as in claim 14, wherein:
the housing includes a depression in which the member is rotationally located, and
the demounting preventing means comprises
a first peripheral lip on the member, and
a second peripheral lip on the depression wall for trapping the first lip between itself and the floor of the depression.

16. Apparatus as in claim 15, wherein:
the second lip traps the first lip at least when the member is at or between the first and second positions.

17. Apparatus as in claim 1, wherein:
rotation of the member from the first position toward the second position occurs in a first direction, and rotation of the member from the second position toward the first position occurs in a second direction, and which further comprises
first means for preventing rotation of the member out of the first position in the second direction, and
second means for preventing rotation of the member out of the second position in the first direction.

18. Apparatus as in claim 17, wherein:
the member rotates through an arc of a predetermined number of degrees in rotating from one position to the other, and
the preventing means comprises
surface features on the member and the housing which abut when the member is in the first and second position.

* * * * *